United States Patent
Stone

(10) Patent No.: US 10,786,755 B2
(45) Date of Patent: Sep. 29, 2020

(54) LOW-RETENTION PRE-COLUMNS: A STRAIGHTFORWARD APPROACH TO ENABLE LARGER INJECTION VOLUMES AND REDUCE EXTRA-COLUMN EFFECTS IN HPLC

(71) Applicant: Mark A. Stone, San Rafael, CA (US)

(72) Inventor: Mark A. Stone, San Rafael, CA (US)

(*) Notice: Subject to any disclaimer, the term of this patent is extended or adjusted under 35 U.S.C. 154(b) by 725 days.

(21) Appl. No.: 15/400,473

(22) Filed: Jan. 6, 2017

(65) Prior Publication Data

US 2017/0173496 A1  Jun. 22, 2017

Related U.S. Application Data

(63) Continuation-in-part of application No. 14/838,070, filed on Aug. 27, 2015, now Pat. No. 9,804,133.

(60) Provisional application No. 62/275,734, filed on Jan. 6, 2016.

(51) Int. Cl.
| | |
|---|---|
| *G01N 30/16* | (2006.01) |
| *G01N 30/20* | (2006.01) |
| *G01N 30/38* | (2006.01) |
| *B01D 15/40* | (2006.01) |
| *B01D 15/14* | (2006.01) |
| *B01D 15/32* | (2006.01) |
| *B01D 15/30* | (2006.01) |

(52) U.S. Cl.
CPC ........... *B01D 15/14* (2013.01); *B01D 15/305* (2013.01); *B01D 15/322* (2013.01); *B01D 15/40* (2013.01); *G01N 30/16* (2013.01); *G01N 2030/201* (2013.01); *G01N 2030/202* (2013.01); *G01N 2030/207* (2013.01); *G01N 2030/387* (2013.01)

(58) Field of Classification Search
CPC ............ G01N 30/16; G01N 2030/027; G01N 2030/201; G01N 2030/202; G01N 2030/207; G01N 2030/387; B01D 15/265; B01D 15/40
See application file for complete search history.

(56) References Cited

U.S. PATENT DOCUMENTS

| | | | | |
|---|---|---|---|---|
| 4,180,389 A | * | 12/1979 | Paul ...................... | B01D 15/12 95/11 |
| 4,554,071 A | * | 11/1985 | Ruijten ................. | B01D 15/08 210/198.2 |

(Continued)

OTHER PUBLICATIONS

Pesek et al., "Aqueous normal-phase chromatography using silica-hydride-based stationary phases", Trends in Analytical Chemistry, vol. 42, pp. 64-73. (Year: 2013).*

(Continued)

*Primary Examiner* — Natalie Huls
(74) *Attorney, Agent, or Firm* — Craig M. Stainbrook; Stainbrook & Stainbrook, LLP

(57) ABSTRACT

Low-retention pre-columns that allow increased injection volumes of solvents chromatographically stronger than the mobile phase and use of solvents with limited solubility in the mobile phase, such as ethyl acetate and MTBE. The system and method also reduces band broadening due to the extra-column effects acting upstream of the analytical column, including band broadening due to the injection process and due to the connecting tubing and fittings between the injection system and the column. A pre-column may also be used as a guard column, thereby minimizing band broadening due to the guard column.

13 Claims, 13 Drawing Sheets

Use of a Pre-Column to Enable a More Easily Used TurboFlow Apparatus

(56) References Cited

U.S. PATENT DOCUMENTS

| | | | | |
|---|---|---|---|---|
| 5,047,073 A * | 9/1991 | Stetter | B01D 53/30 | 95/8 |
| 5,198,115 A * | 3/1993 | Stalling | G01N 25/14 | 210/137 |
| 5,498,279 A * | 3/1996 | Klemp | G01N 30/463 | 96/104 |
| 6,190,550 B1 * | 2/2001 | Oberhauser | B01D 15/08 | 210/198.2 |
| 8,759,753 B1 * | 6/2014 | Di Bussolo | B01D 15/325 | 210/198.2 |
| 2007/0295664 A1 * | 12/2007 | Glatz | G01N 30/462 | 210/656 |
| 2014/0047906 A1 * | 2/2014 | Herman | G01N 30/34 | 73/61.55 |
| 2014/0147878 A1 * | 5/2014 | Herman | G01N 33/82 | 435/29 |
| 2018/0236377 A1 * | 8/2018 | Stone | B01D 15/18 | |

OTHER PUBLICATIONS

Edge, Tony; Turbulent flow chromatography in bioanalysis; Bioanalytical Separations, Handbook of Analytical Separations; vol. 4 (2003), pp. 91-128.

Chassaing, Christophe and Robinson, Sarah, "Turbulent Flow Chromatography: an Evolving Solution for Bioanalysis"; Chromatography Today, Sep. 2009, pp. 20-24.

Couchman, Lewis, "Turbulent flow chromatography in bioanalysis: a review"; vol. 26, Biomedical Chromatography, Jun. 25, 2012, pp. 892-905.

Herman., Joseph L. and Edge, Tony, "Theoretical Concepts and Applications of Turbulent Flow Chromatography"; LCGC North America, vol. 30, No. 3, Mar. 2012, pp. 200-214.

Groskreutz, Stephen R. and Weber, Stephen G., "Temperature-assisted on-column solute focusing: A general method to reduce pre-column dispersion in capillary high performance liquid chromatography"; Journal of Chromatography A; www.elsevier.com/locate/chroma, Feb. 2014, pp. 65-74.

Groskreutz et al., Stephen R: "Temperature-based on-column solute focusing in capillary liquid chromatography reduces peak broadening from pre-column dispersion and high volume overhoad when used along or with solvent-based focusing"; Journal of Chromatography A; www.elsevier.com/locate/chroma; Jun. 8, 2015, pp. 133-139.

Bakalyar et al., Stephen R., "Choosing sample volume to achieve maximum detection sensitivity and resolution with high-performance liquid chromatography columns of 1.0, 2.1 and 4.6 mm I.D."; vol. 762, Journal of Chromatography A; www.elsevier.com/locate/chroma; 1997, pp. 167-185.

* cited by examiner

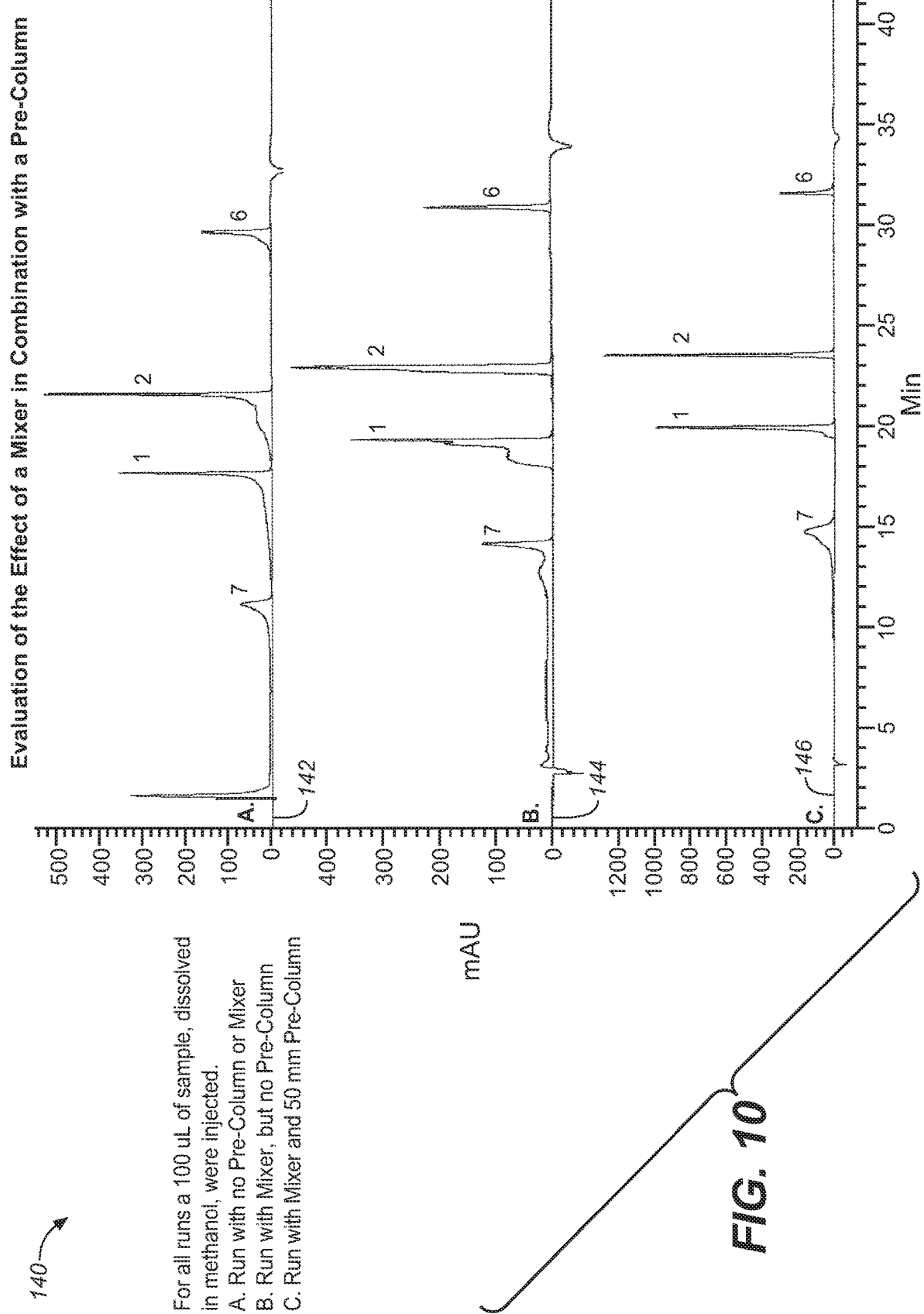

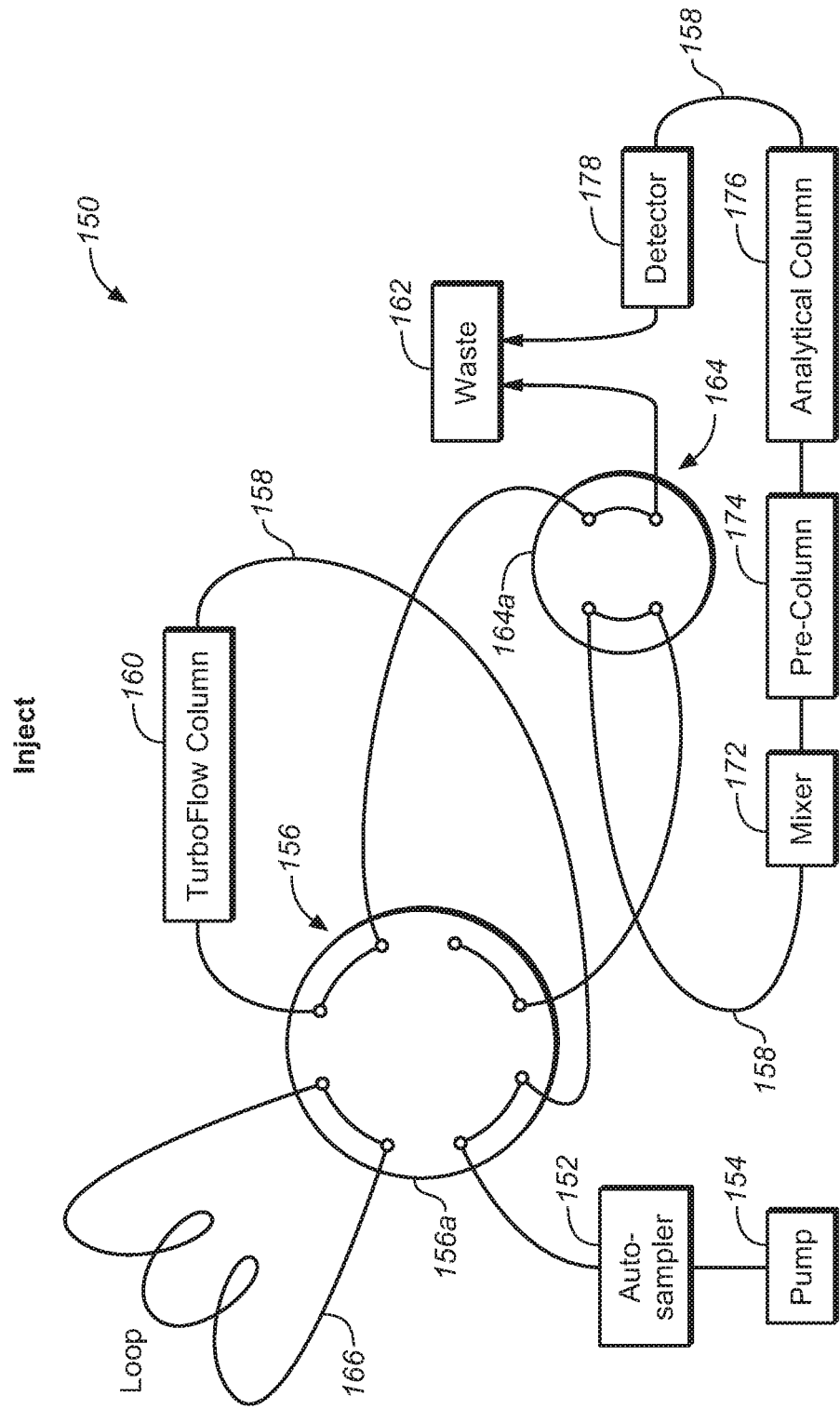

LOW-RETENTION PRE-COLUMNS: A STRAIGHTFORWARD APPROACH TO ENABLE LARGER INJECTION VOLUMES AND REDUCE EXTRA-COLUMN EFFECTS IN HPLC

CROSS REFERENCES TO RELATED APPLICATIONS

The present application is a continuation-in-part of U.S. patent application Ser. No. 14/838,070, filed Aug. 27, 2015, and further claims the benefit of U.S. Provisional Patent Application Ser. No. 62/275,734, filed Jan. 6, 2016 (Jan. 6, 2016), both applications incorporated in their entirety by reference herein.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates most generally to chromatography, and more particularly to high performance liquid chromatography ("HPLC"), and still more particularly to low-retention pre-columns for use in HPLC that enable larger injection volumes and reduce extra-column effects.

Background Discussion

A common objective in high performance liquid chromatography (HPLC) is to obtain better sensitivity. The easiest way to accomplish this is to increase the injection volume. However, the analyst has a limited ability to do this as the chromatography will degrade as larger volumes are injected. This is due to two phenomena: First, there is a distortion or "smearing" effect that occurs as the injection solvent (the diluent) begins to mix with the mobile phase. The smearing occurs because when different solvents are combined, they do not dissolve into one another immediately, even when the solvents are completely miscible. As a result, some distortion and spreading of the injected sample occurs. It has been shown that the distortion increases when the viscosity difference between the diluent and the mobile phase is significant and, in such cases, the phenomenon is characterized as "viscous fingering". Second, as an increasingly larger volume is injected, there is some degree of band broadening due directly to the volume and time of the injection itself. In many cases, larger injection volumes may be utilized simply by using a diluent that is chromatographically weaker than the mobile phase (predominantly aqueous for reversed phase separations). However, this option is not available when the analytes are insufficiently soluble, or when the matrix is insufficiently dissolved or dispersed, in these diluents. In such cases other techniques must be used to increase the injection volume.

There has been much written in the technical literature to address this problem. The majority of the literature either reports or recommends the use of valve switching techniques using an external trap. Such systems typically utilize a two-part process: in the first step a large volume is injected and concentrated onto a trap, and in the second step the valve is switched and the analytes are transferred from the trap onto the analytical column. Because of the more complex nature of the process and the associated apparatus, these methods can be more challenging to run and are disadvantageous for method development and troubleshooting.

Another approach, pioneered by Waters Corporation (Milford, Mass.), is the At-Column Dilution technique. In this technique the analytes are injected into a stream of chromatographically strong mobile phase in which the analytes are readily soluble. This is combined, immediately upstream of the column, with a stream of chromatographically weak mobile phase, in which the analytes often have limited solubility. Typically, 95% of the total flow into the column is from the weak mobile phase line and 5% is from the strong mobile phase line, such that an initial mobile phase composition of 95/5 would be delivered to the column during the beginning of the run. One of the primary benefits of this approach is that the two mobile phase streams are mixed together and delivered to the head of the column so rapidly that there is not time for precipitation to occur prior to the analytes entering the stationary phase at the head of the column. Therefore, it becomes possible to inject larger quantities of analytes that are not highly soluble in the initial mobile phase, as precipitation, and the resulting poor peak shapes and potential clogging of the system, may be avoided. The chromatographically weak nature of the mobile phase allows for good focusing at the head of the column.

There are, however, a few problems with this approach. First, given the short time between when the two fluid streams are mixed together and when they reach the head of the column, there will be insufficient time for the two mobile phases to completely and uniformly mix. Hence, "packets" of weak solvent and "packets" of strong solvent will be present at the head of the column (e.g., water and acetonitrile, respectively, in the case of reversed phase chromatography). And the presence of the "packets" of chromatographically strong solvent will make focusing at the head of the column less effective, which ultimately limits the volume that can be injected. Secondly, the fact that the sample is delivered in the strong mobile phase line, which is typically flowing at around 5% of the total flow rate, means that it will take a longer time for the sample to be delivered to the column. Ten column volumes are often required for the loading step. This adds to the overall run time and results in higher volumes of solvent being consumed, and waste being generated. Lastly, the technique can, in some cases, result in a loss of sensitivity due to the inherent dilution.

The various approaches used historically suffer from being complex or having significant limitations; and, in some cases, offer only limited increases in injection volume. There is, therefore, an as-yet unmet need for an HPLC technique that allows significant increases in injection volumes when using chromatographically strong diluents, which is also straightforward for the end user to implement and which does not have significant restrictions or limitations on its use.

SUMMARY OF THE INVENTION

In an embodiment, the present invention includes one or more low-retention pre-columns incorporated in an HPLC system. The pre-columns allow larger injection volumes of solvents that are chromatographically stronger than the mobile phase. Solvents with limited solubility in the mobile phase, such as ethyl acetate and MTBE, can be used as the diluent. The method increases the injection volume and reduces band broadening due to the extra-column effects acting upstream of the analytical column. This includes band broadening due to the injection process as well as to the connecting tubing and fittings between the injection system and the column.

In another embodiment, a pre-column is also used as guard column, and any band broadening due to the guard column is also minimized. This approach significantly reduces difficulties associated with the use of smaller diameter columns.

In still another embodiment, the pre-column is employed in combination with a turbulent flow ("TurboFlow") column, inasmuch as TurboFlow columns selectively retain small molecules while allowing large molecules to pass. This approach is advantageous for bioanalytic methods and for injecting blood and plasma directly without sample preparation.

In yet another embodiment, a pre-column enables the use of highly aqueous diluents with HILIC methods, preferably by using a non-polar phase as the pre-column. In its implementation, mixing of the injection solvent into the mobile phase is minimized, such that solutes are present primarily in the aqueous diluent when passing through the pre-column, and thereby effectively retained on the pre-column. A timed injection method is also preferably employed, wherein an injection loop is filled with an excess of sample and held a set time so that the sample delivered from the loop is essentially undiluted with mobile phase.

Yet another embodiment involves use of a pre-column configured to generate turbulent, or non-laminar, fluid flow, possibly by packing the column with particles. Connection tubing may be similarly configured.

The foregoing methods and apparatus allow the aqueous sample to be delivered to the pre-column as a plug unmixed with the mobile phase.

In still another embodiment, a segment of a pre-column comprises a turbulent flow column followed by a second segment of laminar flow pre-column.

Experiments demonstrate the effectiveness of the inventive system, both in increasing injection volume and in reducing band broadening. In all the embodiments, the pre-column approach significantly reduces problems associated with the use of smaller diameter columns in HPLC.

BRIEF DESCRIPTION OF THE DRAWINGS

FIG. 10 is a graph evaluating the effect of a mixer in combination with a pre-column.

FIG. 11A is a highly schematic diagram showing an embodiment of an HPLC system wherein a pre-column enables more easy use of a TurboFlow column. The figure specifically depicts the valves configured for the inject mode.

DETAILED DESCRIPTION OF THE INVENTION

Figure 1:
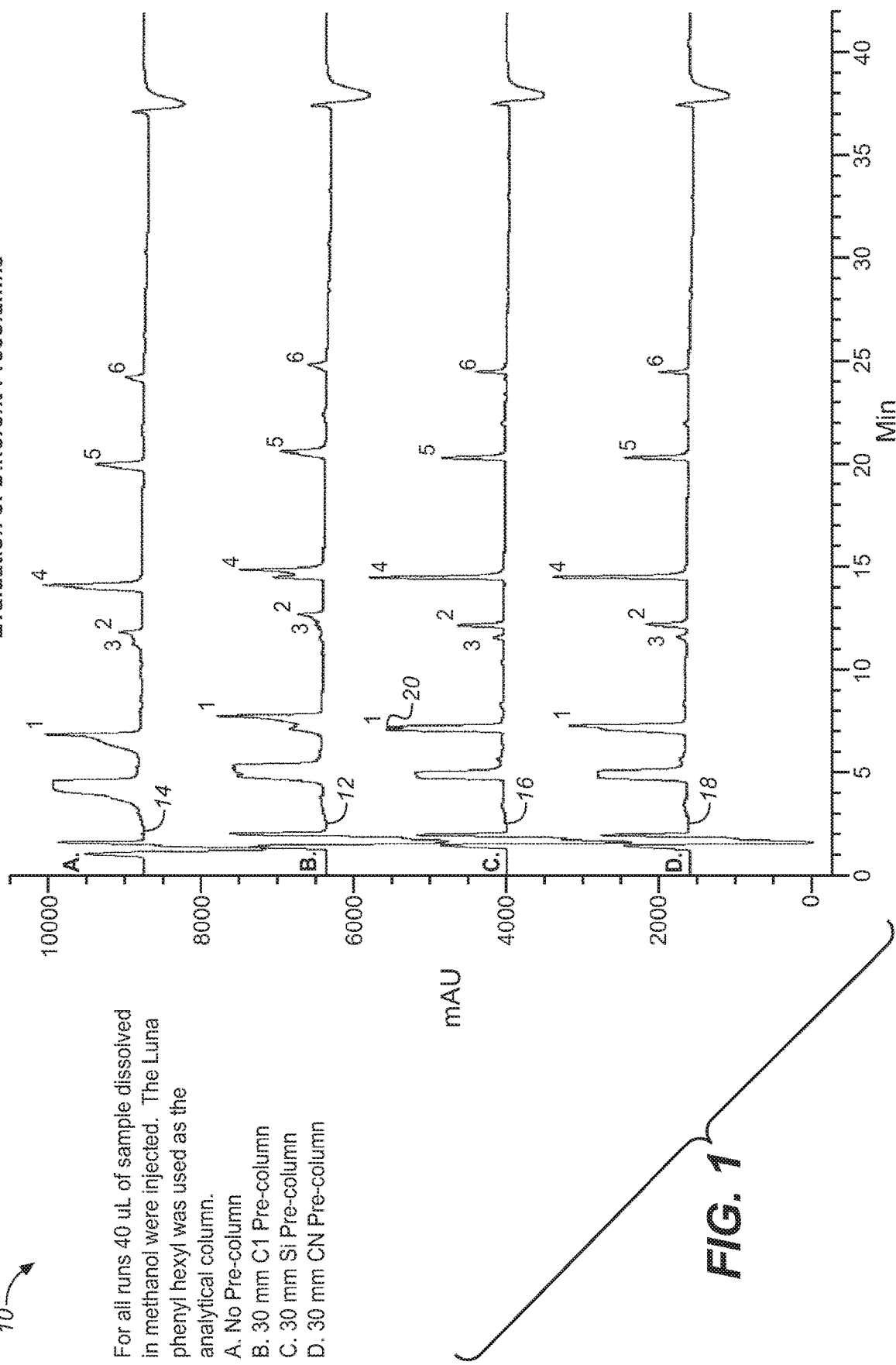
FIG. 1 is a graph comparing chromatograms for three different pre-columns (including a C1 pre-column, a Si pre-column, and a CN pre-column), along with a control with no pre-column.

Data generated in tests conducted by the present inventor show that the use of pre-columns can achieve the above-described objectives. Experiments demonstrating these capabilities were conducted with a pre-column having a less retentive stationary phase than the analytical column and placed upstream of the analytical column via a direct connection. No valve or additional hardware was required.

The purpose of a less retentive pre-column is best appreciated by considering it in terms of a two-step process: First it serves to separate the injection solvent from the solutes by allowing the injection solvent to move through more quickly, so that when the solutes reach the analytical column, they focus at the head of the column in a far more effective manner because the injection solvent is "out of the way". Second, efficient focusing of the solutes onto the head of the analytical column is enabled because the linear velocity of the solutes on the pre-column is greater than the linear velocity of the solutes on the analytical column. This differential in linear velocity is critical for efficient focusing.

Although this is a two-step process, everything occurs in one linear flow path. Additional pumps, valve switching, or programming of timed events is not required. It is, therefore, not difficult to implement in any standard HPLC system, and it does not add significantly to the effort or complexity required for either method development or routine analysis.

This novel approach was initially utilized as a means of increasing injection volume. However, more generally, it also reduces—and in the best cases, entirely eliminates—the effects of the extra column effects that act upstream of the analytical column. In addition to the band broadening due to the volume injected and the injection process, this includes band broadening due to the length and diameter of the connecting tubing between the injection system and the column, as well as band broadening due to dead volume in the fittings upstream of the column. In addition, if the pre-column is also used as the guard column, any band broadening due to voids or insufficient packing of the guard column (a common problem in HPLC) will be eliminated as well.

Experimental:

All experiments were run on an Agilent 1100 HPLC system with a G1322A pump, a G1313A automatic injector, and a G1314A variable wavelength detector (Agilent, Little Falls, Pa.). All data was processed on an Agilent ChemStation Version 8.

The pre-columns used in the course of the study were as follows:

Waters Spherisorb C1, 4.6×30 mm, 5 µm
Waters Spherisorb CN, 4.6×30 mm, 5 µm
Waters Spherisorb CN, 4.6×50 mm, 5 µm
Waters Spherisorb CN, 4.6×100 mm, 10 µm
Waters Spherisorb Silica, 4.6×30 mm, 5 µm In the first phase of the study a Phenomenex Luna phenyl hexyl column, 4.6×150 mm, 5 µm was used as the analytical column and different 30 mm pre-columns were evaluated. Mobile Phase A was 95/5 water/acetonitrile with 0.1% (v/v) Formic Acid and Mobile Phase B was 95/5 acetonitrile/water with 0.12% (v/v) Formic Acid. The gradient began at 15% B and ramped to 90% B over 30 minutes. The composition was kept at 90% B for an additional 5 minutes and then re-equilibrated to 15% B for 7 minutes. The flow rate was 1 mL/minute and the UV detection wavelength was 200 nm. Cream samples were prepared by weighing approximately 300 mg of cream (containing 0.1% of the active pharmaceutical ingredient) and bringing to a 10 mL final volume with methanol which contained 20 µg/mL diphenyl as the internal standard. The samples were vortexed for 3 minutes, centrifuged at 3000 RPM for 20 minutes, and then filtered through a 0.45 µm nylon filter.

In the second phase of the study, different initial mobile phase compositions were evaluated using a 4.6×100 mm, 10 µm cyano pre-column. The conditions were otherwise the same as above, except that a 7 minute isocratic hold was added at the beginning of the run, which was set to a mobile phase composition of 5, 10, or 20% B.

For the next set of experiments the effect of different analytical columns were evaluated; and once the best performing analytical column was identified, the maximum injection volumes that could be successfully utilized with different lengths of pre-column were determined. For these studies the gradient began with a 7 minute isocratic hold at 5% B, then increased linearly to 80% B at 35 minutes, and then to 95% B at 37 minutes. The composition was held at 95% B for three minutes, and the system was then re-equilibrated to 5% B over an interval of 12 minutes. The sample preparation was reduced such that 200 mg of sample were diluted to a 20 mL final volume. This prevented mass overloading of the column when the higher injection volumes were evaluated. In addition, the flow rate was reduced to 0.8 mL/min to avoid excessive pressures when the longer pre-columns were tested. The following analytical columns were evaluated, in combination with a 30 mm cyano pre-column: Phenomenex GEMINI®-NX (organo-silica layers grafted onto a silica core), C18 (octadecyl carbon chain bonded to silica), 4.6×150 mm, 5 um; Phenomenex Luna phenyl hexyl, 4.6×150 mm, 5 um; Phenomenex Luna C18, 4.6×150 mm, 3 um; and Waters Xterrra RP8 (polar embedded), 4.6×150 mm, 3.5 um. The Phenomenex GEMINI®-NX was selected for use in the remainder of the study. [GEMINI® is a registered trademark of Phenomenex Corporation, Torrance, Calif.]

In the final study, evaluating the effect of a mixer, a 50 mm pre-column was installed, and a modified gradient was used which began at 6% B and was held there for 6 minutes, ramped to 80% B at 20 minutes, and then to 95% B at 28 minutes, held at 95% B for 1 minute, and then equilibrated back to 6% B with the run ending at 43 minutes. Only methylparaben, propylparaben, 4-hydroxybenzoic acid, and butylated hydroxytoluene were present, all at a concentration of 25 µg/mL in methanol. Lastly, the wavelength used was 278 nm.

In all chromatograms the peaks are designated as follows: 1=Methylparaben, 2=propylparaben, 3=degradation product of API, 4=API (proprietary structure), 5=diphenyl (internal standard), 6=butylated hydroxytoluene (BHT), 7=4-hydroxybenzoic acid.

Results and Discussion:

The first experiments were done to evaluate the effectiveness of pre-columns with different stationary phases. The pre-column must exhibit some retention of the solutes in the presence of a high percentage of chromatographically strong solvent. And, simultaneously, the pre-column should be minimally retentive, relative to the analytical column, such that the linear velocity of the solutes on the pre-column is significantly higher than on the analytical column during the transfer step. Therefore, ideally, the pre-column should be just retentive enough to separate the solvent peak from the rest of the analytes. In reversed phase chromatography, more polar phases and phases with shorter ligands are, generally, less retentive. Therefore, three types of stationary phases were evaluated on a pre-column of 30 mm length: a C1 column, a cyano column, and a silica column (no bonded phase). The conditions and parameters used for this study are discussed in the experimental section.

As can be seen in FIG. 1, a graph evaluating different pre-column chromatograms 10, the worst chromatography was obtained with the C1 pre-column 12. In fact, the chromatography was worse than that obtained with no pre-column 14. It would seem the C1 phase is far more retentive than was expected. The silica and cyano pre-columns, 16, 18, both gave improved chromatography in comparison to the run with no pre-column. The cyano column was determined to be somewhat better as more splitting was observed for peak 1 20 with the silica column. Therefore, the remaining experiments were conducted with a cyano pre-column.

Figure 2:
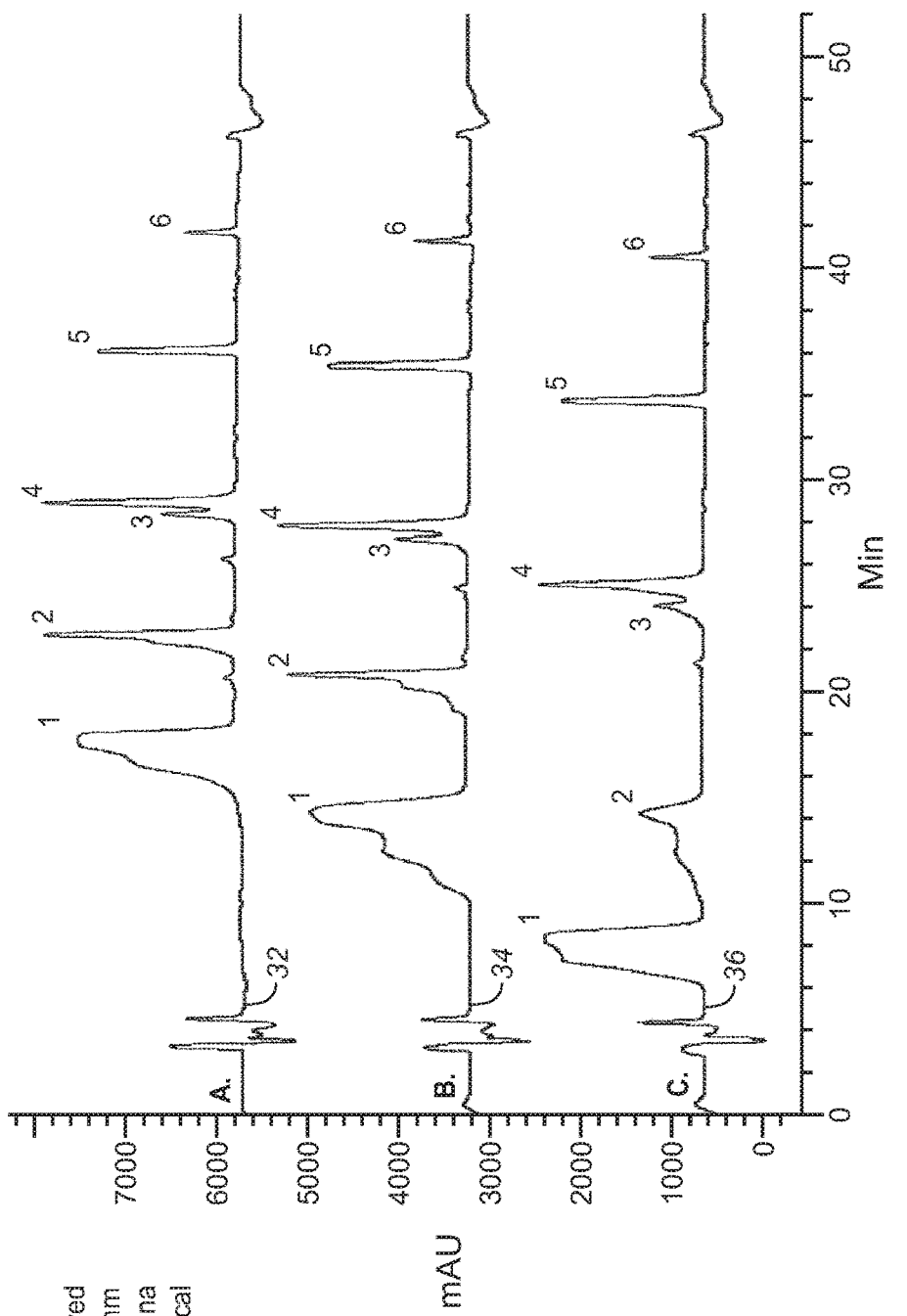
FIG. 2 is a graph including chromatographs evaluating a series of runs of sample dissolved in methanol, in which a 100 mm cyano pre-column was used with varying mobile phase modifier concentrations.

The next step was to evaluate the effect of different initial mobile phase conditions, as shown in the graph 30 of FIG. 2. This was done using a 100 mm cyano pre-column and conditions otherwise the same as above except that a 7 minute isocratic hold was added to the beginning of the run, with the initial composition set to five percent B (5%) 32, ten percent B (10%) 34, and twenty percent B (20%) 36. By examination of the chromatograms in FIG. 2, it is clear that better chromatography was obtained when the initial organic content of the mobile phase was lower. This would be expected since this technique relies on focusing at the head of the analytical column and focusing is more effective when the mobile phase composition is weaker. It is not surprising that the effect was less noticeable for the later eluting peaks as these components focus sufficiently well even at stronger mobile phase conditions. These observations also suggest that when the pre-column technique is applied to an isocratic method, it would be less effective for early eluting peaks.

Figure 3:
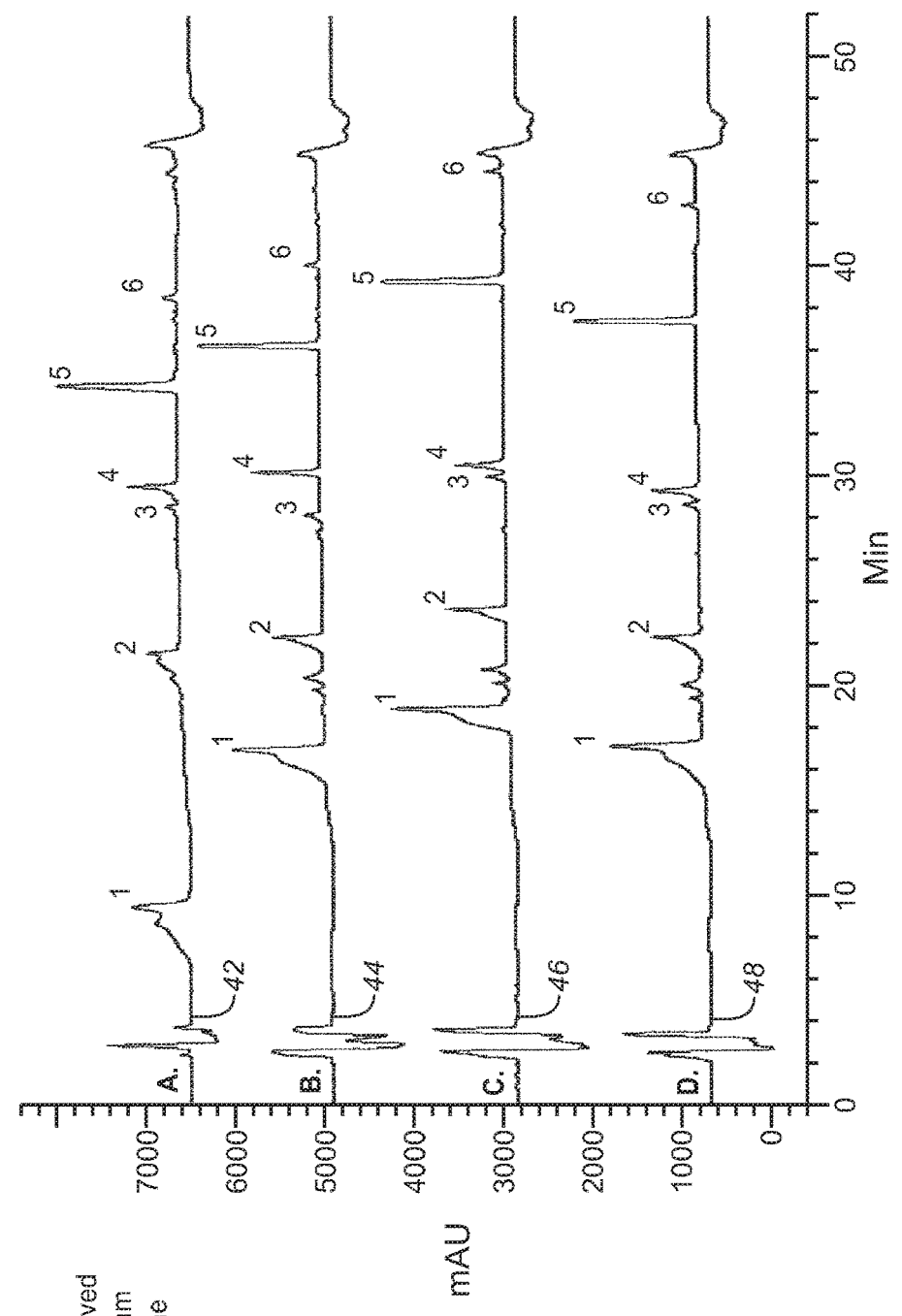
FIG. 3 is a graph comparing the performance of different analytical columns in which a sample was dissolved in methanol and injected into a 30 mm cyano pre-column.

The next step was to evaluate the chromatography obtained with different analytical columns. This study was conducted with a 30 mm cyano pre-column. The chromatograms 40, shown in FIG. 3, demonstrate that the Xterra RP8 column 42 was the least effective in comparison to the other three columns 44, 46, 48, as demonstrated by the very poor peak shapes of peaks 1 and 2. This is expected and logical as the Xterra column 42 is somewhat less retentive than the others due to the polar embedded group and, therefore, focusing at the head of the analytical column is less effective. The phenyl hexyl column 44 was somewhat better. However, the best chromatography was observed for the Luna C18 46 and the Gemini NX C18 48. Again, this is logical as these are the more hydrophobic of the columns evaluated and, therefore, are expected to be the most retentive. A decision was made to use the Gemini NX column for the remainder of the study.

Figure 4:
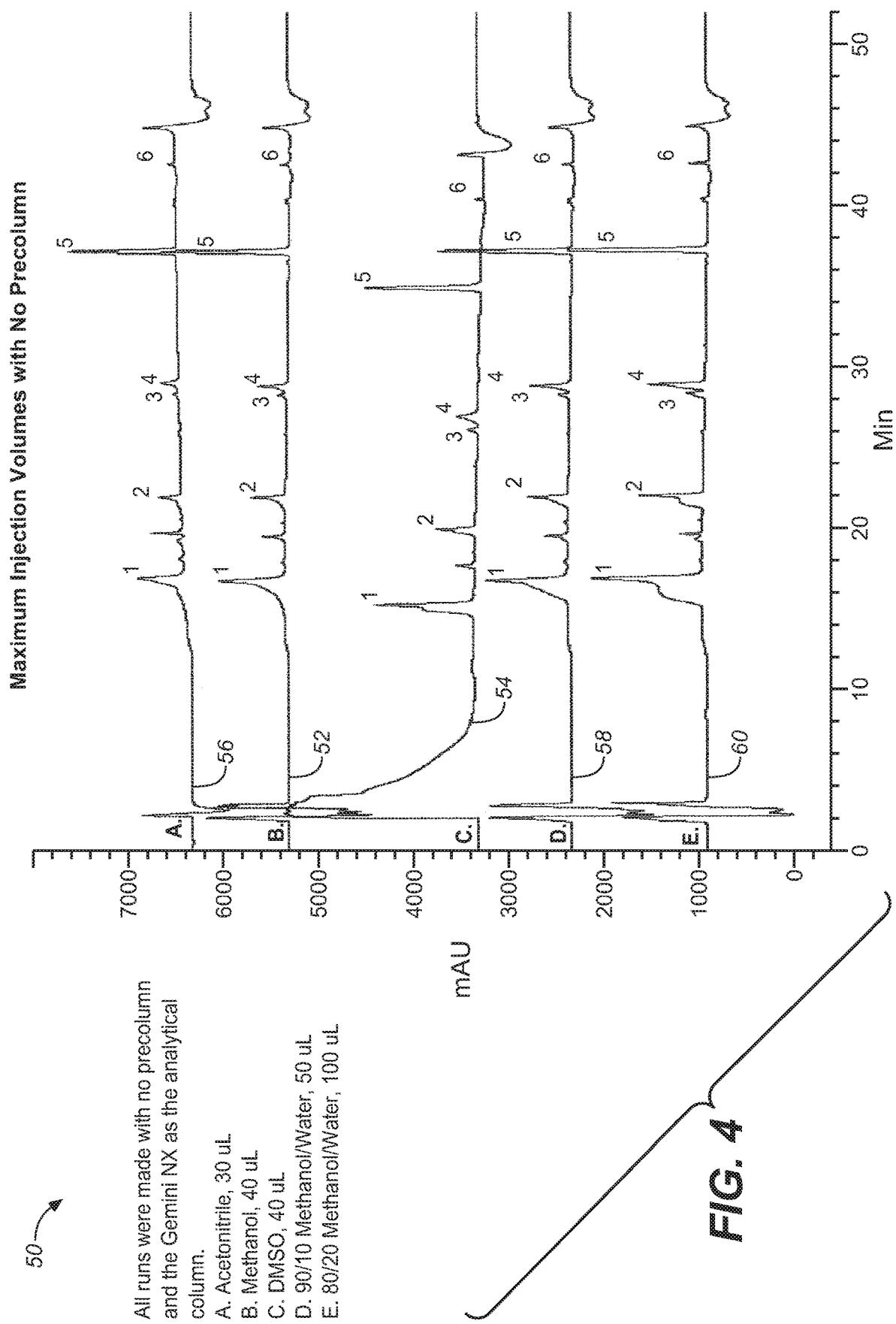
FIG. 4 is a graph comparing maximum injection volumes in which no pre-column was used for samples dissolved in 5 different solvents.
Figure 5:
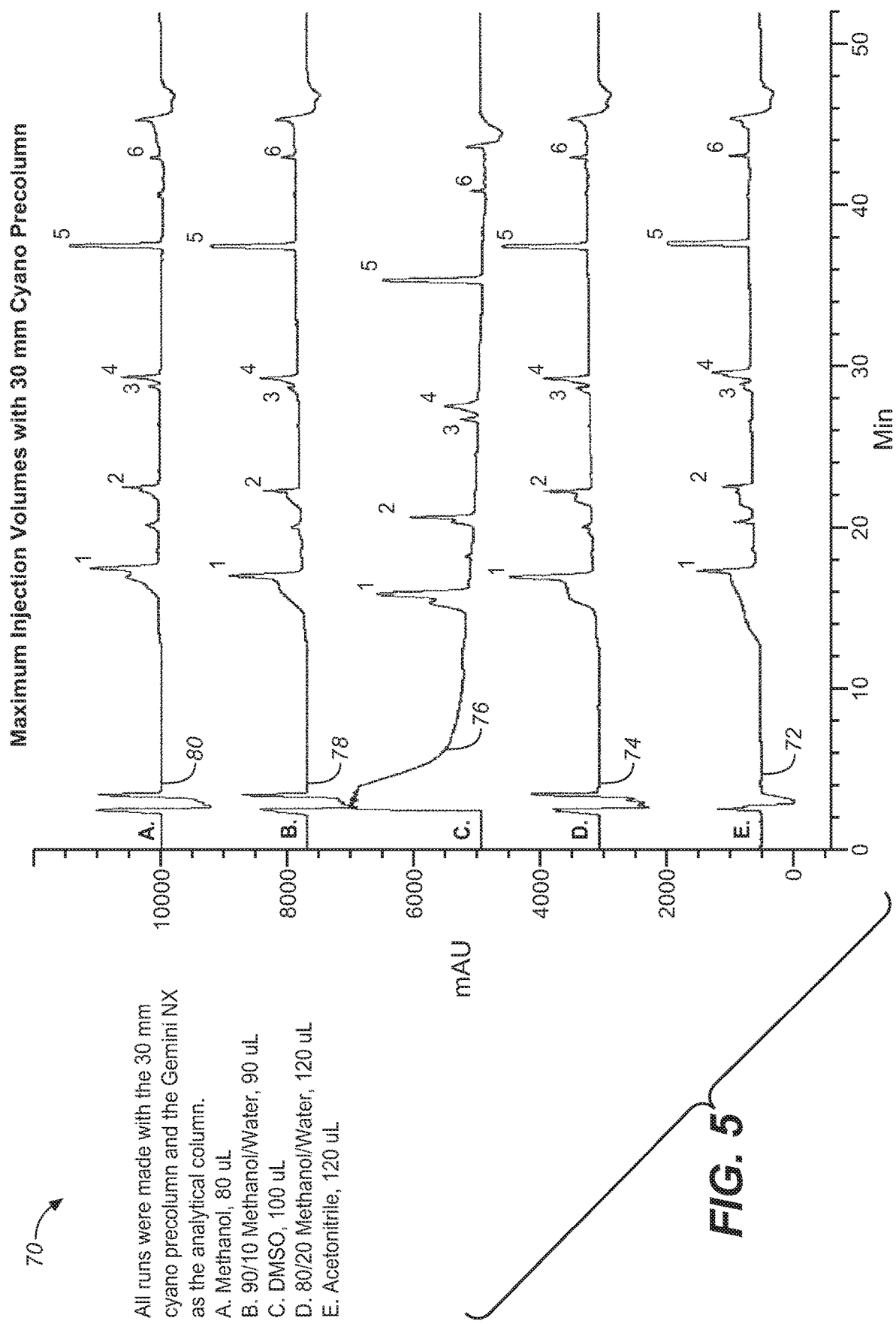
FIG. 5 is a graph showing the differences in the maximum injection volumes using a 30 mm cyano pre-column and the same injection solvents used in FIG. 4.
Figure 6:
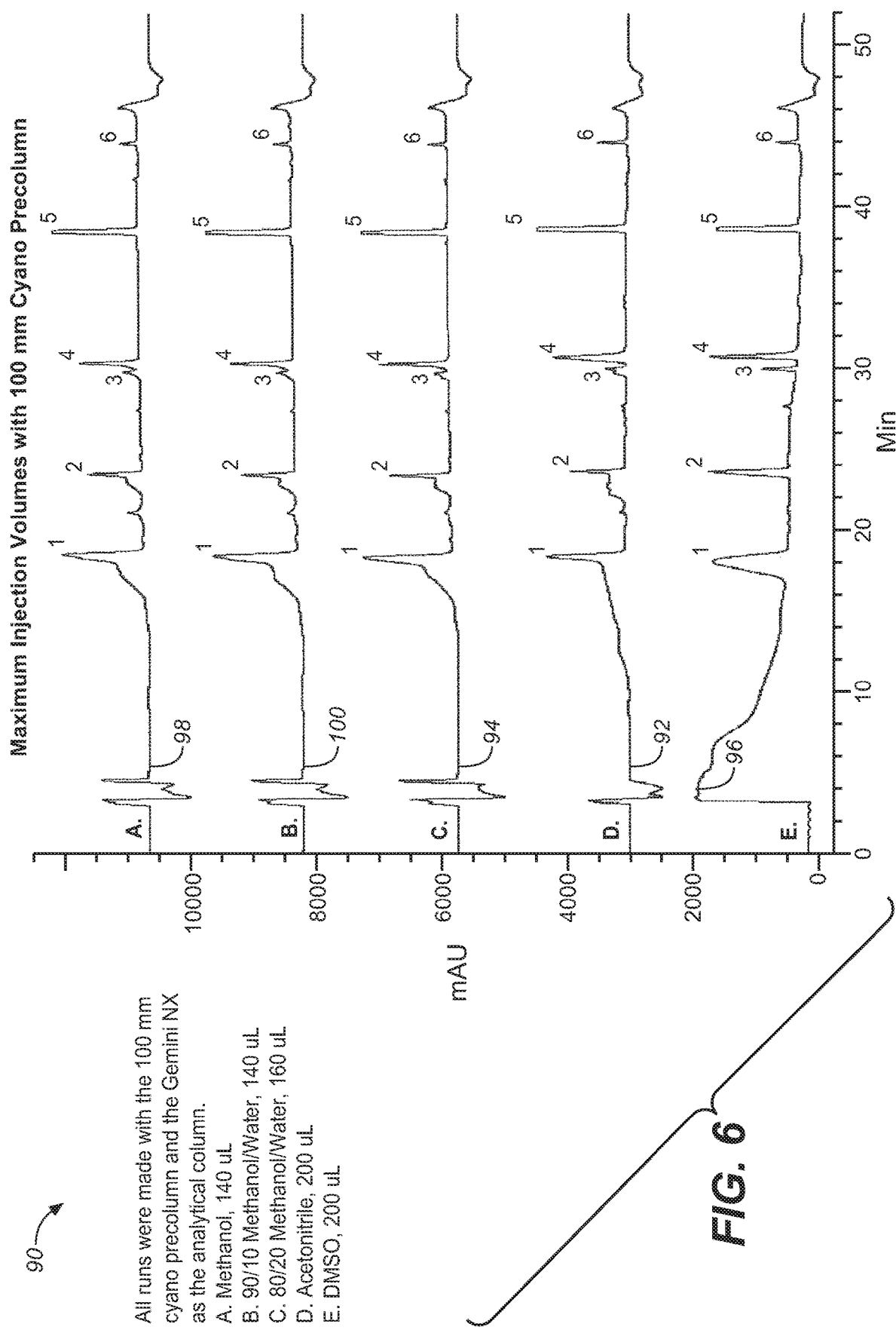
FIG. 6 is a graph showing the differences in the maximum injection volumes using a 100 mm cyano pre-column and the same injection solvents used in FIGS. 4-5.

Referring next to FIGS. 4-6, a series of experiments were then conducted to evaluate the maximum injection volume that gave acceptable chromatography with different lengths of pre-column (or no pre-column) and with different injection solvents. The definition of acceptable chromatography is somewhat subjective. Since the goal here was to "push the limits" of usable injection volume, the peak shapes are somewhat asymmetrical, in many cases. This makes conventional parameters such as plate count more difficult to apply. It was decided to focus on the two most closely eluting components, peaks 3 and 4, and define acceptable chromatography as the point at which these peaks 'just begin to lose baseline resolution'. For each set of conditions a series of injection volumes were tried and the chromatogram that most closely fit this definition is displayed in FIGS. 4, 5, and 6.

FIG. 4 presents the chromatographs 50 of a series of injections made with no pre-column, but with different injection solvents. The data suggest that a larger injection volume is possible with methanol 52 and DMSO 54 in comparison to acetonitrile 56, and that methanol with 10% or 20% water, 58, 60, respectively, allows for even larger injection volumes. There is nothing new or surprising here. It is well known that as the injection solvent becomes chromatographically weaker, a larger injection volume will be possible.

Referring next to FIG. 5, when this experiment was repeated with a 30 mm cyano pre-column in place, several observations were clear from the chromatography 70. The first is that, in all cases, a larger volume could be injected. This varied from 4 times as much for acetonitrile 72 to only 1.2 times as much for 80/20 methanol/water 74. It is logical that there would be less of a benefit for the solvent systems that focused more effectively without the pre-column. What was particularly noteworthy was that the rank ordering of solvent systems changes. Without the pre-column the smallest injection volumes were possible with acetonitrile as diluent. However, with the pre-column in place, the exact opposite was observed and acetonitrile 72 allowed the largest injection volumes. Similarly, DMSO 76 became a more effective solvent than either methanol with 10% water 78 or methanol alone 80 when the pre-column was used. This is believed to be due to the rate at which the various injection solvents disperse into the surrounding mobile phase once injected. This matter will be discussed in more detail below.

Referring now to FIG. 6, it will be seen that when the 100 mm cyano pre-column was put in place, even larger injection volumes were possible, as shown in the chromatographs 90. This is because the longer pre-column allows yet more time and space for the diluent to separate from the analytes, such that the analytes can more effectively focus at the head of the analytical column. In this case the increase in injection volume ranged from 6.7 times for acetonitrile 92 to 1.6 times for 80/20 methanol/water 94 (in comparison to the runs with no pre-column). With DMSO 96 the largest injection volume evaluated was 200 µL, however, it is clear that larger volumes could have been injected. Methanol alone 98 and methanol with 10% water 100 were comparatively less effective.

Figure 7:
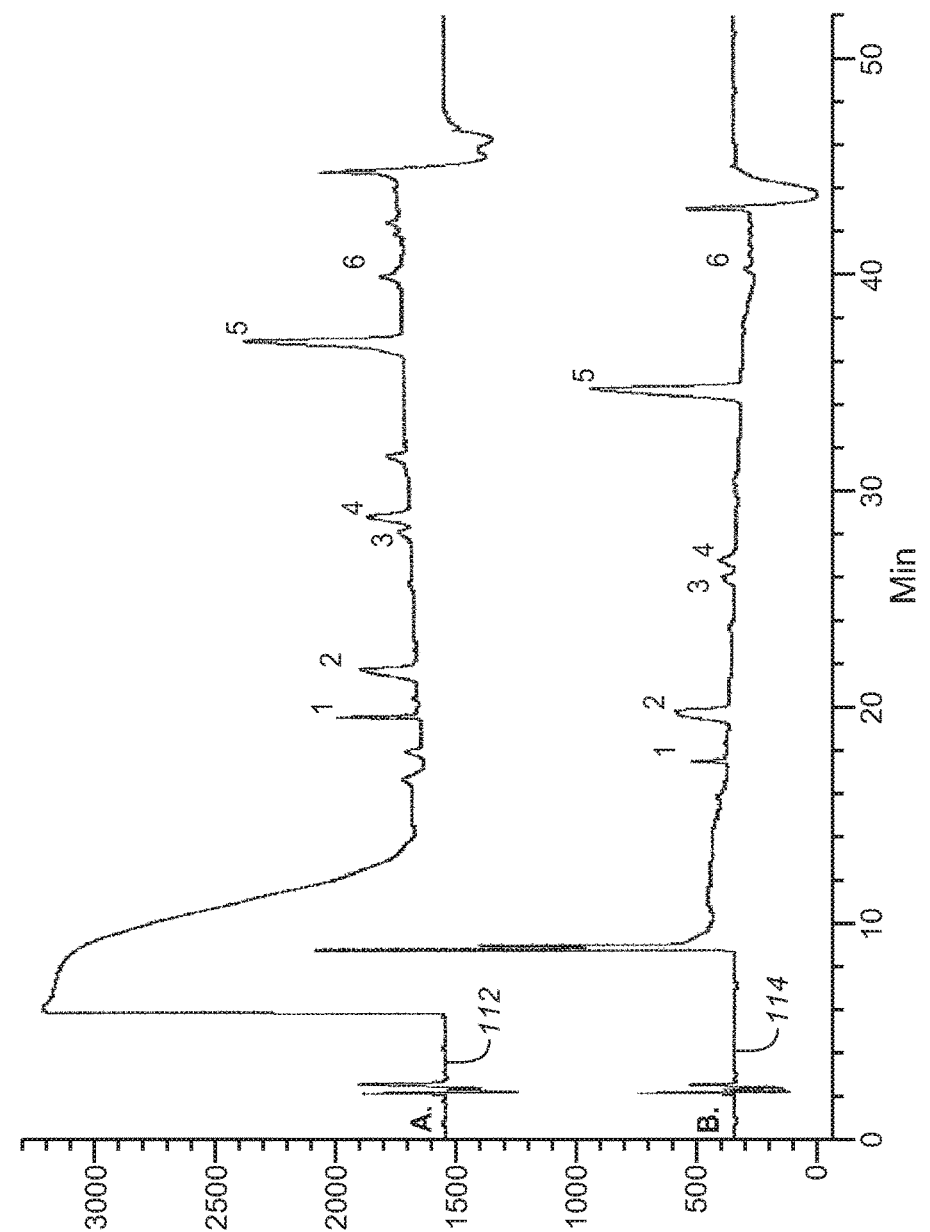
FIG. 7 is a graph comparing the maximum injection volumes for non-water soluble solvents, and using no pre-column.
Figure 8:
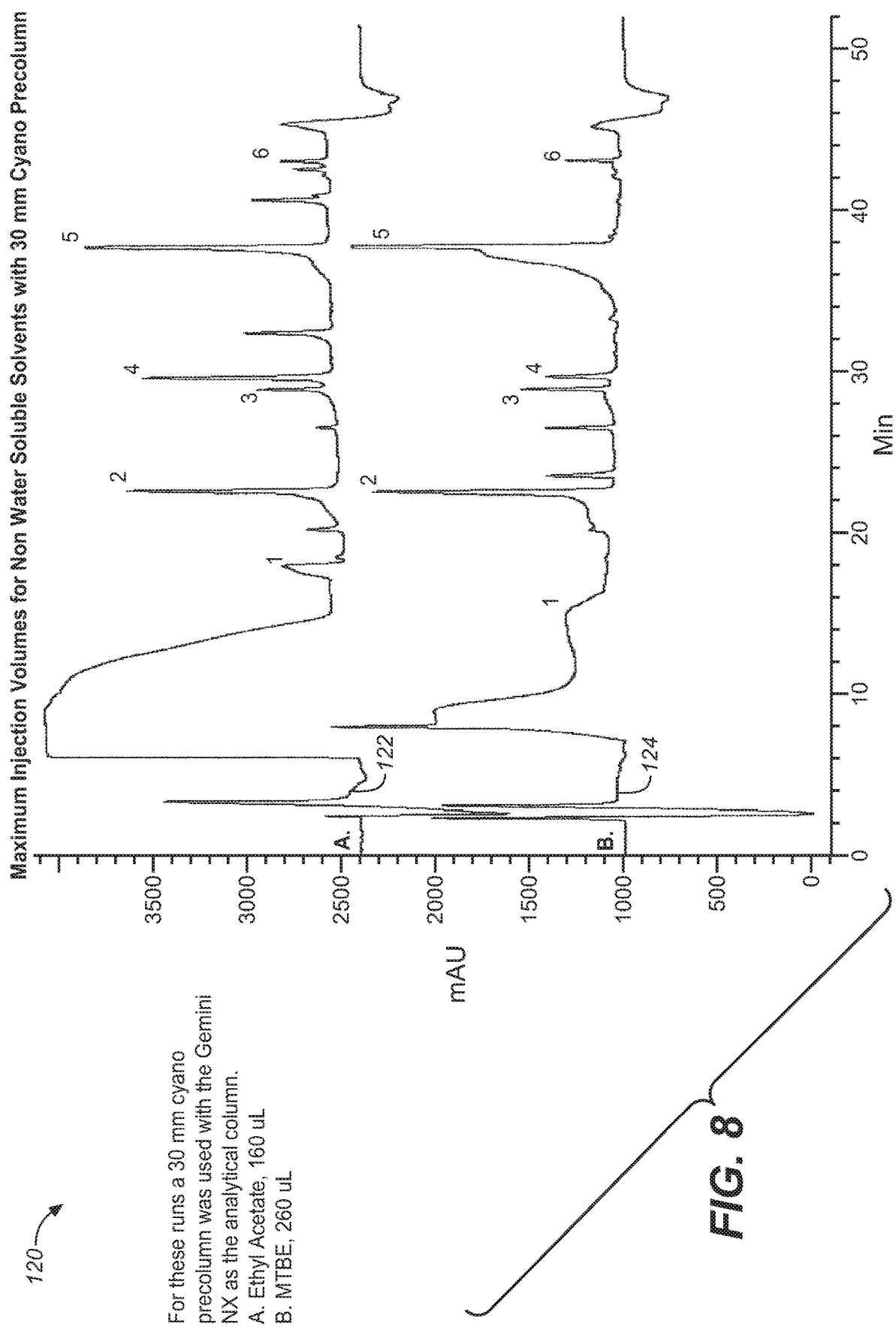
FIG. 8 is a graph comparing the maximum injection volumes using a 30 mm cyano pre-column and the same non-water soluble injection solvents used in FIG. 7.
Figure 9:
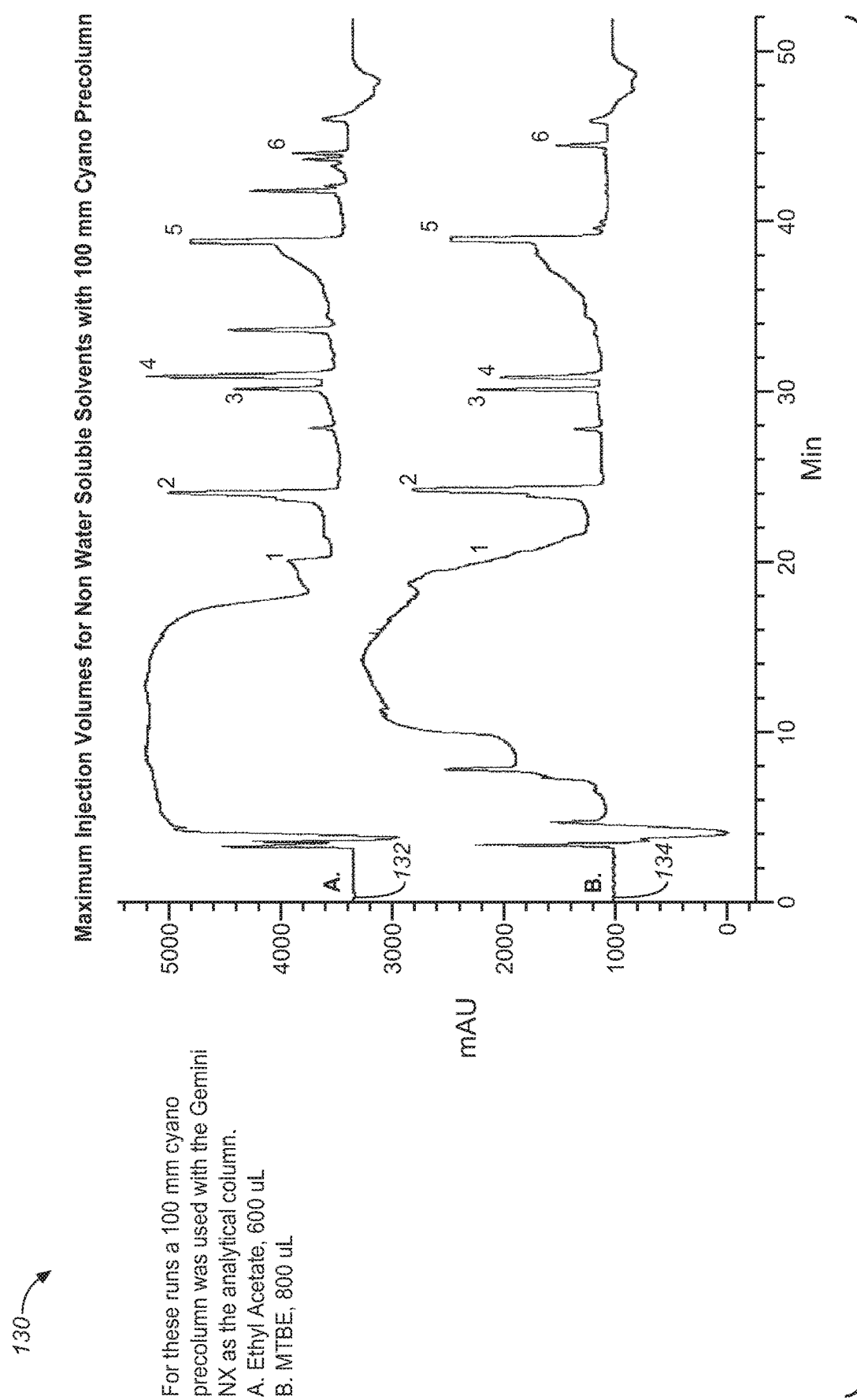
FIG. 9 is a graph comparing the maximum injection volumes using a 100 mm cyano pre-column and the same non-water soluble injection solvents used in FIGS. 7-8.

The next experiments evaluated two injection solvents with limited water solubility: ethyl acetate and methyl tert-butyl ether (MTBE), as shown in the chromatographs 110 of FIG. 7. Only small injection volumes were possible with no pre-column: 35 µL and 40 µL, 112, 114, respectively. However, and referring now to FIG. 8, when these experiments were repeated with a 30 mm cyano pre-column in place the results were surprising. The chromatograms 120 depicted in FIG. 8, show that even larger injection volumes were possible than with the water soluble solvents (FIG. 5). Specifically, the 30 mm cyano pre-column allowed the injection volume to be increased to 160 µL with ethyl acetate 122 and to 260 µL for MTBE 124. When the experiment was repeated with a 100 mm cyano pre-column, as shown in the chromatographs 130 of FIG. 9, as much as 600 µL could be injected for ethyl acetate 132 and as much as 800 µL was possible for MTBE 134 (although peak 1 was lost).

While these results were not expected, a logical explanation may be offered. The fact that solvents such as acetonitrile, methanol, and DMSO are completely water soluble means that as these solvents move through the connecting tubes and the pre-column itself, they can disperse rapidly into the surrounding mobile phase. As this occurs the diluent peak becomes wider. Logically, the wider the solvent peak is, the harder it will be to completely separate it from the analyte peaks as the sample moves through the pre-column. Therefore, some of the solvent peak may still be present at the point when the analytes are focusing at the head of the analytical column, resulting in less efficient focusing. It is believed that the limited water solubility of solvents such as ethyl acetate and MTBE minimizes the extent to which they can disperse into a predominantly aqueous mobile phase. Therefore, the plug of injected material exists as a narrower band as it moves through the system.

Referring again to FIGS. 4-6, it is believed that this reasoning may also explain why acetonitrile and DMSO became better injection solvents than methanol when a pre-column was used. Although all three solvents are miscible with water it is likely that methanol disperses more quickly into a predominantly aqueous mobile phase due to hydrogen bonding interactions and, therefore, moves through the pre-column as a wider band, resulting in less efficient focusing.

However, a cautionary note to keep in mind when using injection solvents which are less soluble in the mobile phase is that, if too much of such a solvent is injected, it can be difficult for that solvent to move completely through the system, precisely because it does not readily dissolve into the mobile phase. It may be that an effective injection solvent, for this technique, would be one that has low to moderate solubility in the mobile phase. For example, combinations such as ethyl acetate or MTBE with 20 to 40% ACN deserve further investigation.

An additional experiment was conducted to evaluate whether placing a mixer upstream of the pre-column would further increase the injection volumes that could be utilized, the results 140 shown in FIG. 10. For this experiment a 50 mm cyano pre-column was used, the wavelength was set to 278 nm, and a standard solution in methanol was injected consisting of methylparaben, propylparaben, 4-hydroxytoluene, and BHT. Conditions were otherwise as above except that the gradient was modified (see experimental section for details).

Therefore, the purpose of this experiment was to evaluate the use of a mixer in combination with a pre-column. Many commercially available mixers are designed to accomplish radial mixing, but they are not particularly effective at longitudinal mixing, which is what is needed for this application. Therefore, for this experiment the mixer was simply an empty 3×30 mm column, the volume of which was calculated to be 212 µL. Because this volume is larger than the volumes injected, it provided an opportunity to mix the sample with the mobile phase, which resulted in a somewhat diluted (hence, weaker) solvent system. As a result, the analytes were expected to be more retained on the pre-column and, therefore, more effectively separated from the strong injection solvent. The results 140, shown in FIG. 10, demonstrate that this expectation was realized. The peak shapes were improved when the pre-column was added (compare run with no pre-column or mixer 142 with run with mixer, but no pre-column 144). But only with the mixer and pre-column in combination 146 were good peak shapes observed for all four analytes, for the 100 µL methanol injection (although the methylparaben peak was still somewhat broadened). Further work should be done to evaluate the effect of longitudinal mixers of different volumes and of more sophisticated designs as well as dynamic mixers. It should be noted that use of larger particles in the pre-column, a somewhat longer pre-column, or the use of wider diameter and/or longer length tubing between the point of injection and the pre-column would also accomplish mixing of the injected sample with the mobile phase. However, with these approaches, there is a significant degree of band broadening that occurs concurrent with the mixing process. It is expected that longitudinal mixers would accomplish mixing with the least amount of spreading of the injected components and is, therefore, believed to be the best approach.

Additional work may be pursued using this approach. First, there are other phases which could be evaluated as to their effectiveness as pre-columns. The ideal phase would be far less retentive than the analytical phase: being retentive just enough to separate the solvent peak from the rest of the analytes. In this work bare silica was found to work well as a pre-column but showed some peak splitting probably due to mass overloading as a result of its limited capacity. A phase such as polyhydroxyethylene (developed specifically for HILIC separations) may work better as it is very polar, like silica, yet also offers reasonable capacity. Phases such as amino and imidazole (also developed for HILIC separations) may be worth investigating as well. Furthermore, since non-porous (or very large pore) stationary phases are less retentive by nature, it is likely that pre-columns made of this type of material would allow for more efficient focusing as they would further enhance the linear velocity of solutes on the pre-column relative to their linear velocity on the analytical column. It would also be advisable to try experiments with pre-columns that have a diameter that is narrower than the analytical column. This would have two benefits: first, the linear velocity of mobile phase through the pre-column would be greater than that on the analytical column which should promote more efficient focusing by more rapidly transferring the analytes to the analytical column; and secondly, longer pre-columns could be used without contributing significantly to the run time or consumption of mobile phase. The tradeoff may be more band broadening on the pre-column due to the higher velocity. However, the low capacity factor of analytes on the pre-column would limit this, and the refocusing at the analytical column should obviate this effect in most cases.

It may be noted that pre-columns also provide a solution to situations where a solute undergoes a reaction or conversion after being injected into the mobile phase. This includes acid/base reactions, complexations, or conversions from one isomeric form to another. Such conversions often result in broad or skewed chromatographic peaks. However, if a pre-column is used, it allows time for the reaction or conversion to occur and, subsequently, enables focusing of the solute onto the head of the analytical column. It is often thought that one of the primary functions of buffers, in HPLC, is to prevent such acid/base conversions during the injection process. Hence, the use of a pre-column may remove the need for buffers in the mobile phase, in certain situations.

It is also noteworthy that pre-columns would enable more efficient, and more easily executed, multidimensional chromatography. One of the difficulties encountered with these techniques is that analysts are limited to methodologies where the different stages of the separation utilize mobile phases that are compatible with one another. A similar situation exists with on-line solid phase extraction. The techniques described above would provide a solution to this. In the same way that they allow injection of solvents typically less desirable for a given mode of separation, they likewise allow less desirable solvents to be delivered from one stage to the next stage of a multidimensional separation; and, similarly, from the solid phase extraction cartridge to the analytical column.

Three unique and valuable applications of the pre-column concept will now be discussed.

Use of a Pre-Column in Combination with the At-Column Dilution Technique:

The At-Column Dilution technique was considered in the Background Discussion, above, and it was stated that one of the fundamental problems with this technique was that there would be "packets" of chromatographically strong solvent and "packets" of chromatographically weak solvent present at the head of the column, and the former would make the focusing process at the head of the column less efficient. By incorporating a pre-column into the system such that the two fluid lines are teed into one another immediately prior to the pre-column (which is then followed by the analytical column), there is now present a mixing step, such that when the analytes are delivered to the head of the analytical column they are focused more efficiently as there are no longer "packets" of chromatographically strong solvent present. It might be thought that a simple mixer, placed upstream of the analytical column, would accomplish the same result. However, this may present problems, as analyte material may precipitate in the mixer. By using a pre-column for this purpose, one of the fundamental precepts of the At-Column Dilution approach is preserved, i.e., that the two mobile phase streams are combined immediately prior to delivery to a stationary phase. A mixer placed downstream of the pre-column may be beneficial in some cases to further ensure complete mixing before the analytes are delivered to the analytical column.

Use of a Pre-Column in Combination with a TurboFlow Column:

The use of a pre-column in combination with a Turbo-Flow column (sold by ThermoFisher) is believed to be quite beneficial. TurboFlow columns are quite effective at retaining small molecules while allowing the large molecules in a sample, such as proteins and most phospholipids, to pass through essentially unretained. This is accomplished because these columns generate turbulent (or non-laminar) flow and thereby leverage the difference in diffusion rates between large molecules and small molecules [T. Edge, Turbulent Flow Chromatography in Bioanalysis, Chapter 4 of Volume 4 of 'Handbook of Analytical Separations', Ed. I. D. Wilson, Elsevier Science, 2003; C. Chassaing, S. Robinson, Chromatogr. Today, September (2009) 20; L. Couchman, Biomed. Chromatogr., 26 (2012) 892; J. L. Herman, T. Edge, LC-GC N. Am., 30 (2012) 200.]

Therefore, this approach allows samples such as blood and plasma to be injected directly with no sample preparation, because the large molecule interferents can be removed on-line.

In what follows the term 'TurboFlow column' will be used to refer to the column that serves to rapidly elute large molecules by generating turbulent conditions. The term does not necessarily signify the commercial product known as a TurboFlow column. Rather, the term signifies a column having the features and characteristics described in International Pat. Application WO97/16724, by Quinn et al (which is incorporated in its entirety by reference herein). In an alternative embodiment, it may be any turbulent flow column that serves the same function.

Elimination of off-line sample preparation is advantageous in any analytical method, but is especially desirable for bioanalytical methods. These studies typically require analysis of well over 500 samples; and secondly, these studies generally require very low levels of detection, and some methods of off-line sample preparation involve dilution which lessens the method's sensitivity. Despite the very beneficial aspects of TurboFlow columns, they are not used extensively. This is likely due to the more complex setup and additional method development that is required by their use.

Systems that use the TurboFlow columns are generally designed with a multi-port valve that diverts the large molecules to waste during the first step of the process, and which is subsequently switched such that the small molecules can be eluted and analyzed. The complication arises in that the small molecules elute from the TurboFlow column with poor peak shapes. Therefore, a second column (the analytical column) is usually needed to focus and then separate the analytes. Since a chromatographically strong solvent is used to elute the analytes from the TurboFlow column, poor focusing would be obtained if the sample were transferred directly to the analytical column. The solution that is generally used is to combine the elution flow stream with another flow stream of chromatographically weak solvent; where, the flow from the chromatographically weak fluid line must be higher than that from the chromatographically strong fluid line, in order to render the resulting (combined) mobile phase as chromatographically weak. In this way, efficient focusing of the analytes may occur at the head of the column. The way the flow streams are combined is identical to the At-Column Dilution approach discussed earlier, and suffers from the same issues, such as the presence of "packets" of chromatographically strong solvent as well as the inherent dilution which may occur when two fluid streams are combined. Given the complex nature of this process, additional method development is required such that the flow rates and chromatographic strengths of the two fluid streams are properly balanced so as to allow the small molecules to be efficiently transferred from the TurboFlow column and focused at the head of the analytical column. Additionally, such setups require two pumps making the system somewhat more complex and generally requiring a specialized and dedicated instrument.

Figure 11B:
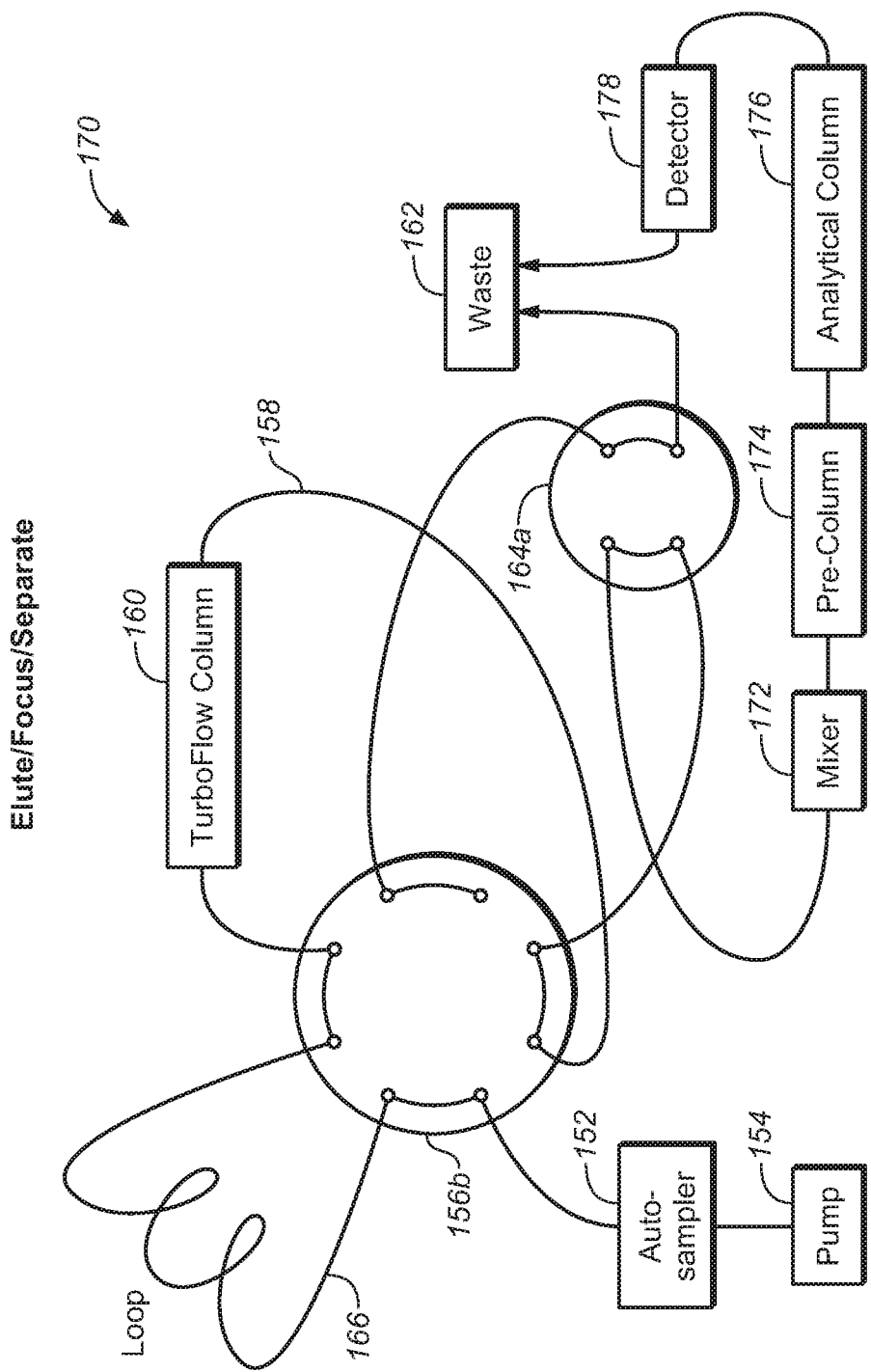
FIG. 11B is the same view showing the valves configured for the elute/focus/separate mode.
Figure 11C:
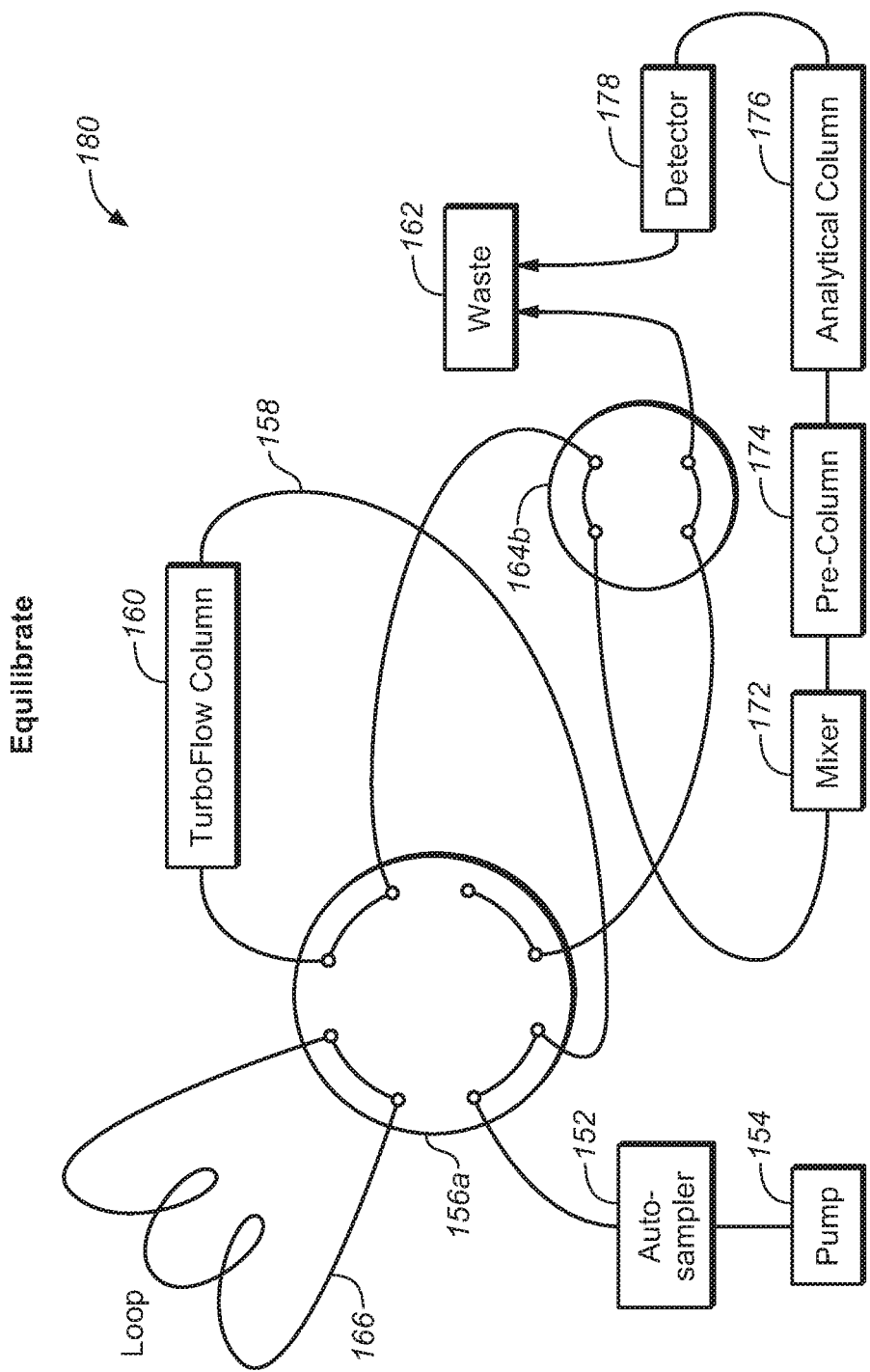
FIG. 11C is the same view showing the valves configured for the equilibrate mode.

The use of a focusing pre-column, placed between the TurboFlow column and the analytical column, offers an easier way to allow analytes being eluted from the TurboFlow column (in chromatographically strong solvent) to focus on the head of the analytical column. An example of an embodiment of such a system is illustrated in FIGS. 11A-11C, which is configurable in three modes: (1) inject; (2) elute/focus/separate; and (3) equilibrate, sequentially and FIGS. 11A-11C, respectively.

Referring now to FIG. 11A, in the inject step 150 the sample is injected into flowing mobile phase by the autosampler 152 using a high pressure pump 154, after which it is directed through fluid lines through a first multi-port HPLC injector valve 156, which is in a first position 156a (for inject mode) that includes paired ports for directing injected fluid through fluid lines 158 into the turbulent flow column 160. Thus, Small molecules are retained on the TurboFlow column 158 while large molecules are eluted and delivered to waste 162 through a second multi-port injector valve 164 in fluid communication with the first multi-port injector valve, which is in a first position 164a for the inject step. In an embodiment, the second multi-port injector valve may be a 4-port valve.

Referring next to FIG. 11B, the elute/focus/separate step 170 begins by switching the eight-port (first multi-port injector) valve to a second position 156b, while maintaining the second multi-port in the first position 162a. In this step and valve configuration, paired ports in first multi-port valve open to direct chromatographically strong solvent, present in a turbulent flow loop 166 at the end of the previous gradient, to and through the TurboFlow column 160, thereby causing the analytes adsorbed in the TurboFlow column to elute. This plug of elution solvent is then directed through first multi-port valve 160 to second multi-port valve 164, which directs the plug of elution solvent to a mixer 172, and then forward to a focusing pre-column 174, where it is separated from the analytes on the pre-column such that the analytes can effectively focus on the head of the analytical column 176. Once the analytes are focused on the analytical column, the gradient begins and the separation develops. A detector 178 then identifies the separated analyte compound bands eluted from the HPLC analytical column.

Lastly, and referring now to FIG. 11C, both first and second multi-port valves are switched (the first back to the first position 156a and the second to a second position 164b), and with the valves in these respective positions, the system is configured for equilibrate mode 180. The advantages in this approach include: only one pump is needed, so that special or dedicated equipment is not required; virtually no method development is required (with respect to this part of the method); and the difficulties mentioned above are obviated (i.e. the presence of "packets" of strong solvent making focusing less efficient and the potential dilution).

Regarding this system setup: First, it is desirable to design the loop such that the flow is turbulent (or non-laminar) as it moves through the loop. In an embodiment, this may be accomplished if the loop is packed with particles designed to induce turbulent flow, but with no sorbent and with a "non-sticky" surface. The benefit of making the flow turbulent as it moves through both the loop and the TurboFlow column, is that the resulting flat flow profile enables the chromatographically strong solvent to move from the loop and through the TurboFlow column with minimal mixing into the mobile phase (which would be chromatographically weak) thereby allowing for more efficient elution of the analytes. Conversely, mixing is desirable prior to transferring the sample to the pre-column, as the resulting dilution in the chromatographically weak mobile phase results in more efficient separation of the analytes from the elution solvent on the pre-column. A longitudinal mixer is recommended as the most effective way to accomplish this (though, as mentioned previously, the use of wider and somewhat longer tubing on those lines, or the use of larger particles in the pre-column, can also help facilitate mixing). It should be noted that, while TurboFlow columns are quite effective at removal of large molecules from a sample, no approach will remove them entirely (a small percentage of proteins and a somewhat higher percentage of phospholipids will make it through to the analytical column). Therefore, in some cases, one might consider placing a cartridge containing material which irreversibly binds proteins and phospholipids (e.g. Zirconia) in line, prior to or following the analytical column, so that the small percentage of proteins and phospholipids that make it through, don't reach the detector and cause an interference. However, this should not be needed in the majority of cases, as the analytes can usually be separated from these components chromatographically. Another alternative to address residual proteins would be to use a Restricted Access Media (RAM) column as the analytical column (RAM columns would not do much to remove phospholipids).

It is expected that the approach, described above and depicted in FIGS. 11A-11C, would make it much easier for laboratories to obtain the benefits of TurboFlow columns.

In an embodiment, one column may serve as both the TurboFlow column and the pre-column. In this case, the Inject step is the same, with the large molecules being rapidly eluted and delivered to waste and the small molecules being trapped. But the subsequent transfer of the analytes to the analytical column is a more simple process, as it is accomplished as part of the analytical separation. The method is preferably designed to facilitate efficient transfer of the analytes from the TurboFlow/pre-column onto the analytical column. This may be done by any of the various approaches described earlier in this application, where the key requirement is that the linear velocity of the analytes is higher on the pre-column than on the analytical column during the transfer. Such a method may require a slow gradient at the beginning of the run, before proceeding with the fast gradient that is typically used in bioanalytical methods. Hence, a somewhat longer overall runtime may be needed. It should be noted that for a single column to serve as both a TurboFlow column and a pre-column, a longer column may be required (in comparison to what would be needed for a column to serve only one function or the other).

Such a method may utilize one valve between the pre-column and the analytical column in order to direct the large molecules to waste during the first step. Alternatively, the valve may be located after both columns. And, in fact, one may choose to use no valve at all (if there is no concern with respect to the large molecules entering the detector). Though, in the absence of a valve, the analytical column would need to tolerate the high flow rates used during the Inject step, in which case a monolithic column may be a logical choice. The approach of using a combined Turbo-Flow column/pre-column, especially with no valve, would represent the ultimate simplicity with which the TurboFlow approach to accomplishing on-line removal of large molecules could be implemented.

Use of a Pre-Column to Allow Injection of Aqueous Diluents in HILIC:

The last unique and compelling application of pre-columns is to allow the use of highly aqueous diluents with HILIC methods. Most of the analytes separated by HILIC methods are water soluble, and therefore, water may be a useful and convenient diluent (for example, it would be possible to do direct injection of biological fluids). However, because water is a chromatographically strong solvent in the HILIC mode, the analyst must generally avoid water as a diluent, or use a very small injection volume. One solution to this is to use a non-polar phase as the pre-column. This may be something like a polar embedded C18 column or a Waters Atlantis column (i.e., preferably something having a particular ability to retain polar analytes in the reversed phase mode). When a sample is injected in water (or a predominantly aqueous diluent) the solutes are retained on the pre-column, by a reversed phase mechanism, because the pre-column contains a non-polar stationary phase, and because the solutes are in a predominantly aqueous solvent. Once the diluent moves through and the HILIC mobile phase begins to take over, the solutes are efficiently eluted from the non-polar pre-column and then re-focused at the head of the polar analytical column. This occurs because the predominantly organic HILIC mobile phase is chromatographically strong in reversed phase mode (on the pre-column) but chromatographically weak in the HILIC mode (on the analytical column).

A key observation with respect to this approach is that it is critical to minimize mixing of the injection solvent into the mobile phase. If mixing is minimized the solutes are present primarily in the aqueous diluent, during passage through the pre-column, and therefore, are most effectively retained on the pre-column. Two recommendations are given for accomplishing this. The first is to use a timed injection technique. The timed injection method is defined as where the injection loop is filled with an excess of sample, and the valve is then switched to the inject position and kept there for a programmed interval of time depending on the desired volume. If the duration of this step is not too high, it is possible for all of the sample delivered from the loop to be essentially 100% pure and undiluted with mobile phase [S. R. Groskreutz, S. G. Weber, J. Chromatogr. A, 1354 (2014) 65; S. R. Groskreutz, A. R. Horner, S. G. Weber, J. Chromatogr. A, 1405 (2015) 133; S. R. Bakalyar, C. Phipps, B. Spruce, K. Olsen, J. Chromatogr., 762 (1997) 167.] This approach is rarely used. However, it is the best method of minimizing mixing of the sample with the mobile phase during the injection process.

The second recommendation is to use a pre-column designed to generate turbulent, or non-laminar, flow (for example, packed with the same type of particles used in the TurboFlow columns, described above). The benefit of turbulent flow is that the resulting flat flow profile allows minimal mixing of the sample with the mobile phase. Similarly, the connecting tubing between the point of injection and the pre-column can be constructed with similar, but not chromatographically active (and "non-sticky"), particles designed to generate turbulent flow (it may also be beneficial to minimize the length of this tubing).

The combination of these recommendations should allow, as much as possible, for the aqueous sample to be delivered to the pre-column as a plug that has not been mixed with the mobile phase. It should be noted that broadened peaks can sometimes result when separations are conducted under turbulent conditions. However, this generally does not occur when the analytes are only moderately retained, as would be the case in this application, and refocusing of the analytes at the head of the analytical column may remove any remaining concern. However, an alternative to consider would be to have a segment of pre-column operating in the turbulent regime followed by a second segment of pre-column operating in the laminar regime. Best results may be generated using such a combination. Lastly, it may also be beneficial, in some cases, to have salt present in the sample as this would further slow the rate of mixing of the injected sample into the mobile phase.

Clearly this technique would be less effective for diluents that have a significant organic content. For example, this approach may not work as effectively for a diluent that was 40% aqueous and 60% organic.

This approach may also work for Supercritical Fluid Chromatography or classical normal phase chromatography. But the volume that could be injected would be limited by the ability of the mobile phase to tolerate water (especially a concern for classical normal phase).

What is claimed as invention is:

1. A column liquid chromatography apparatus enabling larger injection volumes and minimizing extra column effects acting upstream of a column, comprising:
   an analytical column having a stationary phase with a head;
   a turbulent flow column in fluid communication with said analytical column and having a stationary phase for adsorbing and eluting analytes of a predetermined size;
   a focusing pre-column positioned between, and in fluid communication with, said turbulent flow column and said analytical column, and including a stationary phase that separates solutes from the molecules of an injection solvent and enables focusing of solutes onto said head of said analytical column; and
   a turbulent flow loop comprising a section of turbulent flow tubing in fluid communication with, and disposed between, said pre-column and the point at which a solvent is injected, said turbulent flow tubing configured and sized to cause turbulent flow of fluid through said turbulent flow loop.

2. The column liquid chromatography apparatus of claim 1, wherein said stationary phase of said focusing pre-column is less retentive than said stationary phase of said analytical column, thereby allowing an injection solvent to move more quickly than solutes through said focusing pre-column, and furthermore where the linear velocity of the solutes will be higher on said focusing pre-column than on said analytical column because the former is less retentive than the latter, thereby enabling focusing of the solutes at said head of said analytical column.

3. The column liquid chromatography apparatus of claim 2, further including mixing apparatus to facilitate mixing of an injected sample with the mobile phase prior to reaching said focusing pre-column.

4. The column liquid chromatography apparatus of claim 1, wherein said turbulent flow tubing includes particles that induce turbulent fluid flow.

5. The column liquid chromatography apparatus of claim 4, wherein said particles in said turbulent flow tubing are not chromatographically active.

6. The column liquid chromatography apparatus of claim 4, further including a mixing apparatus to facilitate mixing of an injected sample with a mobile phase prior to reaching said focusing pre-column.

7. The column liquid chromatography apparatus of claim 1 wherein when used in a reversed phase mode said stationary phase of said focusing pre-column comprises particles of silica hydride to retain polar solutes in the presence of a non-polar solvent.

8. The column liquid chromatography apparatus of claim 1, wherein when used in any one of a supercritical fluid mode, classical normal-phase mode, or hydrophilic interaction liquid chromatography mode, said stationary phase of said focusing pre-column comprises particles of non-polar material effective at retaining solutes when the injection solvent is aqueous or predominantly aqueous thereby allowing an injection solvent to move through said pre-column more quickly than the solutes.

9. The column liquid chromatography apparatus of claim 8, wherein said focusing pre-column length and the internal diameter of connecting tubing upstream of said focusing pre-column are sized to minimize mixing of an injected sample with a mobile phase prior to reaching the focusing pre-column.

10. The column liquid chromatography apparatus of claim 9, wherein said stationary phase of said focusing pre-column comprises predominantly non-polar material with a degree of polarity thereby causing it to exhibit a degree of retention for the mode of separation being used, but wherein the retention is less than the retention of said stationary phase of said analytical column.

11. The column liquid chromatography apparatus of claim 1, wherein said stationary phase of said focusing pre-column separates solutes from the molecules of injection solvent and enables focusing of said solutes onto the head of the analytical column, and wherein a portion of said stationary phase of said focusing pre-column is a guard column portion containing sorptive materials enabling said focusing pre-column to additionally function as a guard column.

12. The column liquid chromatography apparatus of claim 1, wherein said focusing pre-column has a narrower internal cross-sectional dimension than the internal cross-sectional dimension of said analytical column, such that the linear velocity on said focusing pre-column is higher than that on said analytical column, wherein the differential in linear velocity enables more efficient focusing of solutes at said head of said analytical column.

13. A column liquid chromatography apparatus enabling larger injection volumes and minimizing extra column effects acting upstream of a column, comprising:
   an analytical column having a stationary phase with a head;
   a turbulent flow column in fluid communication with said analytical column and having a stationary phase for adsorbing and eluting analytes of a predetermined size; and
   a focusing pre-column positioned between, and in fluid communication with, said turbulent flow column and said analytical column, and including a stationary phase that separates solutes from the molecules of an injection solvent and enables focusing of solutes onto said head of said analytical column;
   wherein when used in a reversed phase mode said stationary phase of said focusing pre-column comprises particles of silica hydride to retain polar solutes in the presence of a non-polar solvent; and
   wherein said stationary phase of said focusing pre-column comprises silica hydride particles with a generally polar phase bonded to said silica hydride particles, thereby enabling said focusing pre-column to retain non-polar solutes.

* * * * *